(12) United States Patent
Heuer et al.

(10) Patent No.: US 10,459,081 B2
(45) Date of Patent: Oct. 29, 2019

(54) METHODS FOR LOCATING AND POSITIONING, LOCATING SYSTEM, CHARGING STATION, AND CHARGING SYSTEM

(71) Applicants: Jörg Heuer, Oberhaching (DE); Anton Schmitt, Vaterstetten (DE); Xi Zhang, Munich (DE)

(72) Inventors: Jörg Heuer, Oberhaching (DE); Anton Schmitt, Vaterstetten (DE); Xi Zhang, Munich (DE)

(73) Assignee: Siemens Aktiengesellschaft, München (DE)

( * ) Notice: Subject to any disclaimer, the term of this patent is extended or adjusted under 35 U.S.C. 154(b) by 142 days.

(21) Appl. No.: 15/505,223

(22) PCT Filed: Jul. 16, 2015

(86) PCT No.: PCT/EP2015/066290
§ 371 (c)(1),
(2) Date: Feb. 20, 2017

(87) PCT Pub. No.: WO2016/026624
PCT Pub. Date: Feb. 25, 2016

(65) Prior Publication Data
US 2017/0269205 A1    Sep. 21, 2017

(30) Foreign Application Priority Data
Aug. 20, 2014  (DE) .......... 10 2014 216 525

(51) Int. Cl.
*H02J 7/00*   (2006.01)
*G01S 13/93*  (2006.01)
(Continued)

(52) U.S. Cl.
CPC ............ *G01S 13/931* (2013.01); *B60L 53/12* (2019.02); *B60L 53/36* (2019.02); *B60L 53/38* (2019.02);
(Continued)

(58) Field of Classification Search
CPC ........................................ H02J 7/025
(Continued)

(56) References Cited

U.S. PATENT DOCUMENTS 5,819,164 A * 10/1998 Sun .................... G01S 13/75
                                                         455/106
5,821,731 A   10/1998 Kuki et al.
(Continued)

FOREIGN PATENT DOCUMENTS

DE       19756706 A1    6/1999
DE    102004054513 A1    9/2005
(Continued)

OTHER PUBLICATIONS

German Search Report for related German Application No. 10 2014 216 525.3 dated Feb. 23, 2015, with English Translation.
(Continued)

*Primary Examiner* — Yalkew Fantu
(74) *Attorney, Agent, or Firm* — Lempia Summerfield Katz LLC

(57) ABSTRACT

The method for locating a certain object is a method for locating the object by means of a detected locating signal. With this method, locating of precisely this object is checked in such a way that an object with at least a temporally variable reflective property is used, and an influence of this reflective property on the detected locating signal is checked. The locating system has a locating sensor for locating an object by means of a locating signal detected by a locating sensor, as well as an evaluating device which is
(Continued)

configured to check an influence of a temporally variable reflective property of the object on the locating signal detected by the locating sensor.

18 Claims, 2 Drawing Sheets

(51) Int. Cl.
| | |
|---|---|
| *G01S 15/93* | (2006.01) |
| *G01S 17/93* | (2006.01) |
| *G01S 7/41* | (2006.01) |
| *G01S 13/42* | (2006.01) |
| *G01S 15/42* | (2006.01) |
| *G01S 17/42* | (2006.01) |
| *B60L 53/12* | (2019.01) |
| *B60L 53/38* | (2019.01) |
| *B60L 53/36* | (2019.01) |
| *G01S 13/88* | (2006.01) |
| *G01S 7/40* | (2006.01) |

(52) U.S. Cl.
CPC .............. *G01S 7/411* (2013.01); *G01S 13/42* (2013.01); *G01S 15/42* (2013.01); *G01S 15/931* (2013.01); *G01S 17/42* (2013.01); *G01S 17/936* (2013.01); *G01S 7/415* (2013.01); *G01S 7/418* (2013.01); *G01S 13/881* (2013.01); *G01S 2007/4095* (2013.01); *G01S 2013/9364* (2013.01); *G01S 2013/9367* (2013.01)

(58) Field of Classification Search
USPC ........................................................ 320/108
See application file for complete search history.

(56) References Cited

U.S. PATENT DOCUMENTS

| | | | | |
|---|---|---|---|---|
| 6,081,223 | A * | 6/2000 | Kitahara | G01S 13/931 |
| | | | | 340/436 |
| 8,011,237 | B2 * | 9/2011 | Gao | B60C 23/0411 |
| | | | | 73/146.5 |
| 9,764,606 | B2 * | 9/2017 | Makin | B60C 23/0469 |
| 2005/0163511 | A1 | 7/2005 | Cicchiello | |
| 2014/0012448 | A1 * | 1/2014 | Tripathi | G05D 1/0276 |
| | | | | 701/22 |
| 2014/0111019 | A1 * | 4/2014 | Roy | G01V 3/081 |
| | | | | 307/104 |
| 2014/0217966 | A1 * | 8/2014 | Schneider | H02J 50/12 |
| | | | | 320/108 |
| 2014/0239891 | A1 * | 8/2014 | Martin | B60L 11/182 |
| | | | | 320/108 |

FOREIGN PATENT DOCUMENTS

| | | |
|---|---|---|
| DE | 102010027670 A1 | 1/2012 |
| DE | 102011007771 A1 | 10/2012 |
| WO | WO2011006884 A2 | 1/2011 |

OTHER PUBLICATIONS

PCT International Search Report and Written Opinion of the International Searching Authority dated Sep. 29, 2015 for corresponding PCT/EP2015/066290, with English Translation.

* cited by examiner

METHODS FOR LOCATING AND POSITIONING, LOCATING SYSTEM, CHARGING STATION, AND CHARGING SYSTEM

This application is the National Stage of International Application No. PCT/EP2015/066290, filed Jul. 16, 2015, which claims the benefit of German Patent Application No. 10 2014 216 525.3, filed Aug. 20, 2014. The entire contents of these documents are hereby incorporated herein by reference.

BACKGROUND

The present embodiments relate to locating a specific object.

For charging an electric vehicle at a charging station, the electric vehicle is regularly suitable for being positioned at the charging station.

For positioning objects (e.g., containers or vehicles), it is known to use locating methods (e.g., in the form of laser locating or radar locating).

Propagation time measurements and/or concepts based on frequency modulated continuous wave (FMCW) concepts are used in this case. With the use of such concepts, the form of the objects is to be regularly taken into account in order to be able to carry out reliable locating. Reflections often impair the reliability and accuracy of the locating. A particular challenge consists in reliably identifying the object to be located.

SUMMARY AND DESCRIPTION

The scope of the present invention is defined solely by the appended claims and is not affected to any degree by the statements within this summary.

The present embodiments may obviate one or more of the drawbacks or limitations in the related art. For example, an improved method for locating a specific object compared to the prior art is provided. As another example, an improved method for positioning an electric vehicle at a charging station compared to the prior art is provided. As other examples, an improved locating system for locating an object, an improved charging station, and an improved charging system compared to the prior art are provided.

The method according to one or more of the present embodiments for locating a specific object is a method for locating the object using a detected locating signal. In the method, locating of precisely this object is checked such that the object used is one having at least one temporally variable reflection property. An influence of this reflection property on the detected locating signal is checked. According to one or more of the present embodiments, the object may thus be identified by the temporally variable reflection property and, having been identified in this way, may be unambiguously recognized during the locating.

In one embodiment of the method, the locating is radio locating, laser locating, or acoustic locating. These known locating methods are sufficiently known and have been intensively tried and tested for the purpose of locating. The abovementioned methods are based on measurements of the signal propagation time. The measurement of the signal propagation time may be carried out according to methods known from the literature. The measurement of the signal propagation time is carried out in a suitable manner by taking into consideration the complex-valued phase of the spectrum of the received signal and/or based on FMCW.

In one development of the method, the temporally variable reflection property is a temporally periodic reflection property. In this development, the temporally periodic reflection property is suitably expressed in such a modulation of the locating signal that may easily be recognized in a spectrum of the locating signal based on additional spectral components. This is recognizable in a particularly simple manner if the spectral components have one or more discrete accompanying frequencies or are at one or more, at least virtually, discrete frequencies.

In one embodiment of the method, the temporally variable reflection property is formed by an oscillatorily deflected reflection surface. In this way, the temporally variable reflection property may be realized particularly easily in a mechanical manner (e.g., by an electrically drivable piezoelectric oscillator or a linear actuator). For example, the temporally variable reflection property may be realized by a modular supplementary part that, in cooperation with a further part, forms the object. For this purpose, the supplementary part may be arranged on the further part in a simple manner.

In a suitable manner, in the method according to one or more of the present embodiments, the temporally variable reflection property is formed by at least one oscillatory or rotatory movement of at least one part (e.g., of a surface) of the object. A reflective rotor may be present on the surface of the object.

In one embodiment of the method, the temporally variable reflection property is formed by a movement of a piezoelectric oscillator or of a linear actuator.

In this development of the method, the temporally variable reflection property may be realized by a modular supplementary part that, in cooperation with a further part, forms the object. For this purpose, the supplementary part may be arranged on the further part in a simple manner. Piezoelectric ceramics of piezoelectric oscillators are robust to withstand weathering influences and may be of very flat design. Supplementary parts embodied in this way, for example, may therefore be embodied as not very susceptible to weathering influences or travel conditions such as occur in the case of electric vehicles, for example.

In one embodiment of the method, the locating is radio locating (e.g., radar locating), and/or the locating signal is a radar signal, and/or the object is formed with (e.g., from) metal. Metal objects may easily be located by radar locating. For example, the locating of objects formed with metal (e.g., electric vehicles) is particularly significant economically.

In one development of the method, the influence on the locating signal is checked spectrally.

In a suitable development of the method, the influence of the variable reflection property in the range of a frequency or of frequencies of at least 300 Hz (e.g., at most 1 MHz) on the locating signal is checked. These frequencies are already comparatively high by comparison with frequencies that typically occur during movements as a commonplace occurrence (e.g., during electrical charging), such that the object may be reliably recognized by the abovementioned frequencies. For example, frequencies that may be generated by other moving objects may be reliably excluded. In one embodiment, the frequencies are kept stable over time. In this way, the influence of the variable reflection property may be determined particularly accurately.

In one development of the method, the object used is an object that is formed with an electric vehicle or is an electric vehicle.

In the method according to one or more of the present embodiments for positioning an electric vehicle at a charging station, a position of the electric vehicle is detected by a method for locating. The object includes at least one part of the electric vehicle, and/or the object is arranged at least partly on the vehicle. In this way, when carrying out the method according to one or more of the present embodiments, it is possible to check beforehand whether the electric vehicle is actually detected at all. If it is ascertained that the electric vehicle is not currently detected, then it is possible (e.g., via a user interface) to encourage a vehicle driver to occupy a predetermined setpoint position for carrying out the method for positioning the electric vehicle. Proceeding from this setpoint position, the method according to one or more of the present embodiments for locating may then support a more finely resolved positioning of the electric vehicle for charging the electric vehicle.

The locating system according to one or more of the present embodiments has a locating sensor for locating an object using a locating signal detected by the locating sensor. The locating system also has an evaluation device. According to one or more of the present embodiments, the evaluation device is configured to check an influence of a temporally variable reflection property of the object on the locating signal detected by the locating sensor.

In one development, in the locating system according to one or more of the present embodiments, the evaluation device is configured to check the influence of the variable reflection property such as is checked when carrying out a method for locating a specific object, as described above.

The charging station according to one or more of the present embodiments for charging an electric vehicle includes a locating system, as described above, for positioning the electric vehicle. The charging station may be configured for inductively charging the electric vehicle.

The charging system according to one or more of the present embodiments has a charging station, as described above, and an identification element. The identification element has parts that are movable (e.g., periodically) relative to one another. The parts that are movable relative to one another are movable, for example, rotationally (e.g., in the manner of a hub and a rotor rotating around said hub) or oscillatorily relative to one another. In one development, the parts are a clamped end and a free end of an oscillator (e.g., of a piezoelectric oscillator).

In one embodiment of the charging system, the identification element includes an oscillator (e.g., a piezoelectric oscillator) that oscillates at an oscillation frequency (e.g., of at least 300 Hz).

DETAILED DESCRIPTION

Figure 1:
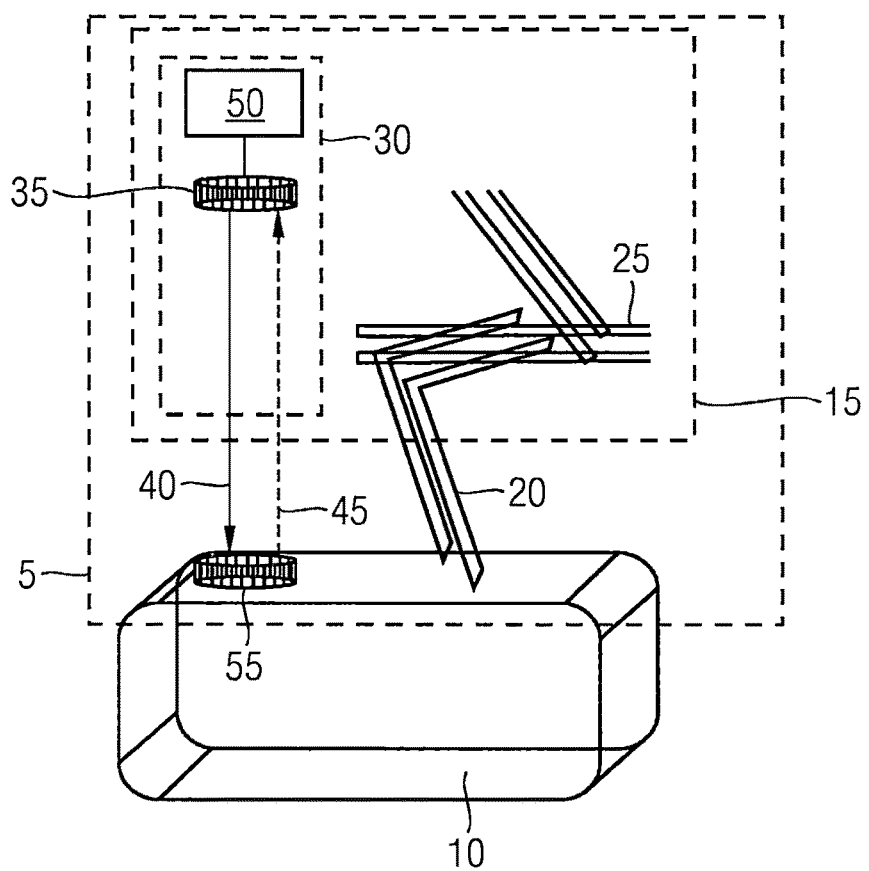
FIG. 1 shows one embodiment of a charging system.

A charging system 5 according to one or more of the present embodiments, as illustrated in FIG. 1, serves for charging an electric vehicle 10. The charging system 5 includes a charging station 15 according to one or more of the present embodiments for charging an electric battery (not shown) of the electric vehicle 10.

The electric vehicle 10 has a pantograph 20 for collecting current at a busbar 25. The busbar 25 is part of the charging station 15 and provides the charging current for charging. For the purpose of charging, the electric vehicle 10 is positioned so that the pantograph 20 is arranged suitably with respect to the busbar 25 of the charging station 15, such that the charging process may be initiated.

For suitable positioning, the charging station 15 has a radio locating system 30 according to one or more of the present embodiments. The radio locating system 30 includes a radar sensor 35. The radar sensor 35 is configured to emit a radar signal 40 having a frequency S0 (see FIG. 2) of 24 gigahertz in the exemplary embodiment illustrated. The radar sensor 35 is also configured to receive a reflected radar signal as locating signal 45. The radio locating system 30 also includes an evaluation device 50 that is signal-connected to the radar sensor 35.

Using the radio locating system 30 according to one or more of the present embodiments, it is provided that the position of the electric vehicle 10 is actually checked, rather than, for example, the position of some other object. For this purpose, the charging system 5 includes an identification element 55 that is arranged on the electric vehicle 10. The identification element 55 includes a metal plate (not specifically illustrated) and a piezoelectric oscillator, by which the metal plate is linked to the electric vehicle 10 in a deflectable manner. For this purpose, the piezoelectric oscillator is clamped rigidly on the electric vehicle 10. The metal plate, by contrast, is linked to the free end of the piezoelectric oscillator.

Using this arrangement, the metal plate is deflected in a direction toward the radar sensor 35 and away from the radar sensor 35 oscillatorily at an oscillation frequency of three kilohertz. The electric vehicle 10 together with the identification element 55 thus forms an object having a temporally variable reflection property. In the case illustrated, the oscillatorily deflected metal plate forms a reflection surface that leads to a temporal variation of the reflection phase. In the exemplary embodiment illustrated, the piezoelectric oscillator is configured for oscillation upon application of the metal plate at an oscillation frequency of 3 kilohertz.

The method according to one or more of the present embodiments for locating a specific object is carried out with the charging system 5 such that the electric vehicle 10 is recognized by the radio locating system 30. The method is carried out specifically as follows. The radar sensor 35 emits a radar signal 40 in the direction of the electric vehicle 10 to be located. The radar signal 40 impinges on the electric vehicle 10 and also, for example, on the oscillatorily deflected metal plate of the identification element 55. In this case, the radar signal 40 is reflected as a locating signal 45 that is modulated, owing to the oscillating reflection phase with the oscillation frequency of the piezoelectric oscillator. Consequently, the locating signal 45 is modulated with an oscillation frequency of 3 kilohertz compared with the radar signal 40. In this case, the oscillation frequency of the piezoelectric oscillator remains constant over time. In further exemplary embodiments, not specifically illustrated, the oscillation frequency is a different frequency (e.g., a frequency from the range of from 300 hertz to the ultrasonic range).

Figure 2:
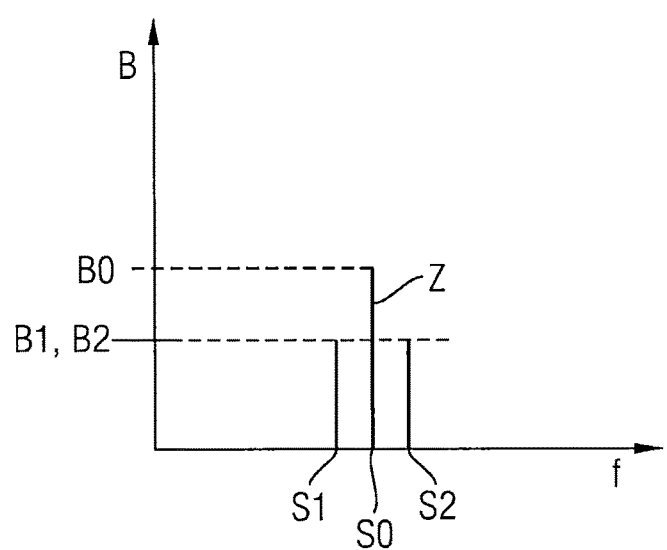
FIG. 2 shows an exemplary spectrum of a locating signal detected by a locating sensor of the charging station in accordance with FIG. 1 when performing the method.

The locating signal 45 is detected by the radar sensor 35 and communicated to the evaluation unit 50 for evaluation. A spectral analysis of the locating signal 45 is performed by the evaluation unit 50. The spectrum illustrated in FIG. 2 represents the contributions of the individual frequencies of the locating signal 45 as a function of the frequency f. The "contributions" are the respective squares of absolute values of the Fourier coefficients of the locating signal 45 ("contribution" hereinafter). The central peak Z corresponds to the dominant contribution B0 of the frequency S0 of the radar signal 40 at 24 gigahertz. Owing to the modulation of the locating signal 45 with the oscillation frequency of the piezoelectric oscillator with an oscillation frequency of 3 kilohertz, sidebands having sideband frequencies S1, S2 occur in addition to the central peak Z in the spectrum. The sideband frequencies S2 are equal to the summation frequency, and the sideband frequencies S1 are equal to the difference frequency of the frequency S0 of the radar signal 40 and the oscillation frequency of the piezoelectric oscillator (e.g., in the illustrated exemplary embodiment where S0=24 GHz, S2=24 GHz+3 kHz and S1=24 GHz−3 kHz).

Using the evaluation unit 50, the locating signal 45 is spectrally decomposed into the contributions B0 of the frequency S0 of the radar signal 40 and also the contributions B1, B2 of the locating signal 45 at the sideband frequencies S1, S2. The contributions B1, B2 at the sideband frequencies S1, S2 are averaged arithmetically and then put into a ratio with the contribution B0 of the frequency S0 of the radar signal 40. If this ratio exceeds a predetermined threshold value, then the evaluation unit 50 ascertains a detection of a locating signal 45 emitted by the electric vehicle 10. If an appreciable ratio (e.g., ratio at least reaching the threshold value, of contributions B1, B2 at the sideband frequencies S1, S2) is not present, then the evaluation unit 50 ascertains that the locating signal 45 has not been reflected by the electric vehicle 10. In this case, the propagation time measurement may be carried out according to the methods known from the literature (e.g., by taking into consideration the complex-valued phase of the spectrum of the received signal and/or based on FMCW).

Using the method according to one or more of the present embodiments for locating the electric vehicle 10, the method according to one or more of the present embodiments for positioning the electric vehicle 10 is carried out (e.g., a position check is additionally carried out in this method). The radar sensor 35 emits the radar signal 40 in a direction in which ideally the electric vehicle 10 is situated in the ideal case (e.g., if the electric vehicle 10 is positioned suitably for charging). In this case, the locating signal 45 is monitored for the oscillation frequency of the piezoelectric oscillator by the evaluation device 50. If, as explained above, it is ascertained that the locating signal 45 has not been reflected by the electric vehicle 10, then the evaluation device 50 communicates a signal to a control device (not illustrated) of the charging station 15. The control device thereupon drives a user interface (not illustrated) of the charging station 15 such that the user interface requests a driver of the electric vehicle 10 to drive to a position of the electric vehicle 10 that is suitable for charging. If this request is complied with, then the locating signal 45 is subsequently actually reflected by the electric vehicle 10, which is ascertained by the evaluation device 50, as described.

Once it has been ascertained that the locating signal 45 is actually reflected by the electric vehicle 10, continuous locating of the electric vehicle 10 is performed by the locating signal 45. Using the locating signal 45, it is possible to emit detailed navigation signals via the user interface, such that the position of the electric vehicle 10 for collecting current at the busbars 25 of the charging station 15 may be optimized based on the locating signal 45.

The exemplary embodiment explained above may be adapted to the effect that the charging station 15 is not necessarily configured for busbar-based charging of the electric vehicle 10.

In one exemplary embodiment, not specifically illustrated, instead of busbars 25 and a pantograph 20, for example, a primary charging coil may be provided on the charging station 15, and a secondary charging coil may be provided on the electric vehicle 10. In the last-mentioned exemplary embodiment, the electric vehicle 10 is then positioned at a position of the electric vehicle 10 such that the relative positioning of primary charging coil and secondary charging coil is effected suitably for charging.

In principle, instead of a radar sensor, a laser sensor with a correspondingly higher laser frequency may be used instead of the radar frequency.

In one exemplary embodiment, not specifically illustrated, an acoustic sensor is used instead of a radar sensor. The acoustic sensor is configured to perform locating by signal propagation time measurements analogously to a radar sensor.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for locating an object using a detected locating signal, the method comprising:
checking the locating of the object such that the object used has at least one temporally variable reflection property; and
checking an influence of the at least one temporally variable reflection property on the detected locating signal,
wherein the at least one temporally variable reflection property is formed by an oscillatorily deflected reflection surface of the object moving away from and towards a sensor, such that the object is located based on a frequency of oscillation of the oscillatorily deflected reflection surface of the object.

2. The method of claim 1, wherein the locating is radio locating, laser locating, or acoustic locating.

3. The method of claim 2, wherein the radio locating is radar locating, the detected locating signal is a radar signal, the object is formed with metal, or any combination thereof.

4. The method of claim 1, wherein the at least one temporally variable reflection property is a temporally periodic reflection property.

5. The method of claim 1, wherein the at least one temporally variable reflection property is formed by at least one oscillatory or rotatory movement of at least one part of the object.

6. The method of claim 1, wherein the at least one temporally variable reflection property is formed by a movement of a piezoelectric oscillator.

7. The method of claim 1, wherein the influence on the detected locating signal is checked spectrally.

8. The method of claim 1, wherein the influence of the at least one temporally variable reflection property in a range of a frequency or of frequencies of at least 300 Hz on the detected locating signal is checked.

9. The method of claim 8, wherein the influence of the at least one temporally variable reflection property in the range of the frequency or of the frequencies of at most 1 MHz on the detected locating signal is checked.

10. A method for positioning an electric vehicle at a charging station, the method comprising:
   detecting a position of the electric vehicle by a method for locating an object using a detected locating signal, the method for locating comprising:
      checking the locating of the object such that the object used has at least one temporally variable reflection property, the at least one temporally variable reflection property being formed by an oscillatorily deflected reflection surface of the object moving away from and towards a sensor, such that the object is located based on a frequency of oscillation of the oscillatorily deflected reflection surface of the object; and
      checking an influence of the at least one temporally variable reflection property on the detected locating signal,
   wherein the object comprises at least one part of the electric vehicle, the object is arranged at least partly on the vehicle, or a combination thereof.

11. A locating system comprising:
   a locating sensor configured to locate an object using a locating signal detected by the locating sensor; and
   an evaluation device configured to check an influence of a temporally variable reflection property of the object on the locating signal detected by the locating sensor, the temporally variable reflection property of the object formed by an oscillatorily deflected reflection surface of the object moving away from and towards the locating sensor, such that the object is located based on a frequency of oscillation of the oscillatorily deflected reflection surface of the object.

12. The locating system of claim 11, wherein the locating is radio locating, laser locating, or acoustic locating.

13. A charging station for charging an electric vehicle, the charging station comprising:
   a locating system for positioning the electric vehicle, the locating system comprising:
      a locating sensor configured to locate an object using a locating signal detected by the locating sensor; and
      an evaluation device configured to check an influence of a temporally variable reflection property of the object on the locating signal detected by the locating sensor, the temporally variable reflection property of the object formed by an oscillatorily deflected reflection surface of the object moving away from and towards the locating sensor, such that the object is located based on a frequency of oscillation of the oscillatorily deflected reflection surface of the object,
   wherein the charging station is configured for inductively charging the electric vehicle.

14. A charging system comprising:
   a charging station for charging an electric vehicle, the charging station comprising:
      a locating system for positioning the electric vehicle, the locating system comprising:
         a locating sensor configured to locate an object using a locating signal detected by the locating sensor; and
         an evaluation device configured to check an influence of a temporally variable reflection property of the object on the locating signal detected by the locating sensor, wherein the charging station is configured for inductively charging the electric vehicle; and
   an identification element of the electric vehicle, the identification element comprising parts that are movable relative to one another in a direction towards and away from the locating sensor, the temporally variable reflection property being formed by the parts that are movable relative to one another, such that movement of the parts cause an oscillation frequency in the locating signal,
   wherein the object is located based on the oscillation frequency of the locating signal.

15. The charging system of claim 14, wherein the identification element comprises an oscillator that oscillates at the oscillation frequency.

16. The charging system of claim 15, wherein the oscillator is a piezoelectric oscillator.

17. The charging system of claim 15, wherein the oscillation frequency is at least 300 Hz.

18. The charging system of claim 14, wherein the parts are movable periodically.

* * * * *